United States Patent Office 3,634,345
Patented Jan. 11, 1972

3,634,345
SYNTHETIC RESINS BASED ON ISOCYANATES
Hans Joachim Diehr, Rudolf Merten, and Konrad Uhlig, Leverkusen, Helmut Piechota, Leverkusen-Mathildenhof, and Christian Weber, Cologne-Stammheim, Germany, assignors to Farbenfabriken Bayer Aktiengesellschaft, Leverkusen, Germany
No Drawing. Filed July 9, 1969, Ser. No. 840,459
Claims priority, application Germany, July 19, 1968, P 17 70 914.7
Int. Cl. C08g 33/02, 53/10
U.S. Cl. 260—2.5                                         7 Claims

ABSTRACT OF THE DISCLOSURE

A process is provided for the production of synthetic resins based on isocyanates using basic catalysts wherein compounds having more than one isocyanate group in the molecule are polymerized using alkali metal salts of aromatic o-hydroxycarboxylic acids as the polymerization catalyst.

---

Various catalysts are available for use in the preparation of synthetic resins by the polymerization of compounds containing aliphatic and aromatic isocyanate groups.

It is already known that the trimerization of isocyanate groups can be induced with alkaline catalysts such as $Na_2CO_3$, $NaOCH_3$, Na-phenolate, Na-benzoate and so on. (Saunders and Frisch "Polyurethanes, Chemistry and Technology," Interscience Publishers 1962 and 1964.)

German Pat. 1,112,285 describes a process for the production of isocyanurate-containing foams by reacting polyhydroxyl and/or polycarboxyl compounds with an excess of polyisocyanate over the quantity required for the reaction with the hydroxyl and/or carboxyl groups as well as the blowing agents if the foam is to be blown by a chemical reaction in which the NCO groups take part. The reaction is carried out in the presence of organic or inorganic compounds which are alkaline in reaction in an aqueous medium and which contain the group $[R—O]^{(-)}Me^{(+)}$ at least once, in which $Me^{(+)}$ represents an alkali metal or a quaternary ammonium group and R represents a hydrogen atom or an alkyl, aralkyl or cycloalkyl group for example.

The polymerization of aliphatic and aromatic (poly) isocyanates can also be carried out at room temperature by using highly reactive catalysts. For practical purposes, it is necessary that the catalysts are capable of being metered conveniently and accurately and that they are readily miscible with the other components to yield reproducible results.

In the "Journal of Cellular Plastics," page 85 (January 1965) Nicholas and Gmitter discuss the powerful catalytic action of a saturated solution of sodium methylate in dimethylformamide on the trimerization of phenyl isocyanate in their description of the activity of catalysts on isocyanate trimerization. The methylate solutions described are commercially disadvantageous, however, since they have to be carefully protected from moisture. As a consequence such solutions cannot be used for the production of foam. Further, sodium methylate as well as other catalysts such as sodium benzoate have only a very limited solubility in solvents such as dimethylformamide, for example, which further complicates their use.

It is therefore an object of this invention to provide a catalyst for the polymerization of isocyanates which is devoid of the foregoing disadvantages.

Another object of this invention is to provide a catalyst for polymerizing isocyanates which is readily miscible with the other components of the reaction mixture and which will yield reproducible results.

Still another object of this invention is to provide a catalyst for the polymerization of isocyanates which can be metered conveniently and accurately and which is soluble in solvents such as dimethylformamide.

Yet another object of this invention is to provide a catalyst for the polymerization of isocyanates which need not be carefully protected from moisture.

A further object of this invention is to provide a trimerization catalyst which will initiate the polymerization of isocyanates to yield synthetic resins having advantageous technological properties.

A still further object of this invention is to provide a catalyst for isocyanate polymerization reactions which will initiate the polymerization even at room temperatures without the application of additional heat and without the reaction becoming uncontrollable.

An additional object of this invention is to provide a catalyst for the production of synthetic resins based on isocyanates which yield heat resistant, noncombustible or combustion resistant coatings, elastomeric products and foamed plastics suitable for a wide variety of applications.

The foregoing objects and others which will become apparent from the following description are accomplished in accordance with this invention, generally speaking, by providing a process for the production of synthetic resins based on isocyanates using basic catalysts wherein compounds containing more than one isocyanate group in the molecule are polymerized using an effective amount of an alkali metal salt of an aromatic o-hydroxycarboxylic acid to catalyze the polymerization reaction. If desired, the reaction mixture may also contain compounds containing hydrogen atoms which are reactive with NCO groups, in which case less than equivalent quantities of the active hydrogen containing compound should be present so that free NCO groups remain to polymerize and form isocyanurate linkages. In addition, the reaction may be carried out in the presence of water and/or other blowing agents in the event that a foamed product is desired. Further, any of the usual additives, auxiliary agents, stabilizers and the like may also be included in the reaction mixture.

This invention also contemplates a unique synthetic resinous product having advantageous technological properties, and particularly foams, based on polyisocyanates which are obtained when a compound having more than one isocyanate group or a mixture thereof with less than equivalent quantities of compounds containing hydrogen atoms reactive with NCO groups is reacted with a sufficient amount of an alkali metal salt of aromatic o-hydroxycarboxylic acids to catalyze the reaction, preferably in dimethylformamide solution and, if desired, in the presence of a blowing agent, stabilizers and the usual auxiliary agents.

The alkali metal salts of aromatic o-hydroxycarboxylic acids of this invention are readily soluble in dimethylformamide and dimethylacetamide at room temperature. A comparison of the solubility of sodium salicylate in dimethylformamide with that of sodium benzoate and sodium methylate shows that, at room temperature 100 g. of sodium salicylate are soluble in 100 g. of dimethylformamide but less than 5 g. of sodium benzoate or sodium methylate are soluble in 100 g. of dimethylformamide. Further, the catalysts of this invention initiate the uniform polymerization of the isocyanate groups, even at room temperature without the application of additional heat and without the reaction becoming uncontrollable due to the spontaneous evolution of heat. The initiators of this invention are therefore eminently suitable for use in the production of synthetic resins, particularly foam resins, based on isocyanates. In addition, when dimethylformamide is employed as the diluent, the use of other blowing agents may be superfluous since dimethylformamide reacts with isocyanate groups to liberate carbon dioxide.

Any polyisocyanates may be used in the practice of this invention including aliphatic, cycloaliphatic, araliphatic and aromatic polyisocyanates, with aromatic polyisocyanates being preferred. For example, alkylene diisocyanates such as tetra- and hexamethylene diisocyanate and the like; arylene diisocyanates and their alkylation products such as phenylene diisocyanates, naphthylene diisocyanates, di- and triisopropylbenzene diisocyanates, triphenyl methane diisocyanates and the like; p-isocyanatophenylthiophosphoric acid triester and p-isocyanatophenyl phosphoric acid triester and the like; aralkyl diisocyanates such as 1-(isocyanatophenyl)-ethyl isocyanate and the xylylene diisocyanates and the like and mixtures thereof may be employed. One may also use polyisocyanates containing any substituents such as alkoxy, nitro, chloro or bromine or those which have been prereacted with less than equivalent quantities of polyhydroxyl compounds such as trimethylol propane, butane diol, glycerol or hexane triol. The polyisocyanates prepared as described in Belgian Pat. 714,805 can also be used in the invention as well as those polyisocyanates prepared by aniline-formaldehyde condensation followed by phosgenation, the latter compounds being particularly suitable. The isocyanates listed in Canadian Pat. 698,636 may also be used as well as mixtures of different isocyanates, in which case monoisocyanates such as phenyl isocyanate, naphthyl isocyanate and the like including those listed in Canadian Pat. 698,636 may also be employed.

One may also use masked polyisocyanates such as, for example, polyisocyanates masked with phenols, oximes or bisulphite and the like; acetal-modified isocyanates and polymerized isocyanates containing isocyanurate rings, as well as higher molecular weight polyisocyanates which can be prepared by reacting monomeric polyisocyanates with lower and/or higher molecular weight polyhydroxyl compounds.

The polymerization of the isocyanate compound may be carried out in the presence of compounds containing at least two hydrogen atoms reactive with NCO groups as determinable by the Zerewitinoff method. It is especially advantageous to use water in which case an additional blowing effect may be achieved. In addition to polyamines or aminoalcohols, one may also advantageously employ, either singly or in admixture, low and higher molecular weight hydroxyl compounds or mixtures thereof. Any of those large numbers of such compounds already known as suitable for use in the production of polyurethane resins including the usual mono- and polyhydric alcohols such as butanol, cyclohexanol, benzyl alcohol, ethylene glycol, propylene glycol, glycerol, trimethylol propane or their addition products with ethylene oxide and/or propylene oxide may be used. Condensation products of polyhydric alcohols such as those referred to above with polycarboxylic acids such as adipic, sebacic, maleic, phthalic or terephthalic acid may also be used as polyfunctional starting components for this purpose. Numerous such compounds are described in "Polyurethanes, Chemistry and Technology," Saunders and Frisch, Interscience Publishers, 1962 and 1964 and in Kunststoff-Handbuch, vol. VII, Vieweg-Hochtlen, Carl-Hanser Verlag, Munich, 1966 as well as in U.S. Pat. 3,201,372.

Solid articles, lacquers, coatings, foams and cellular products can be obtained by the process of this invention; however, the instant process is preferably used for the production of foams.

According to the invention, any alkali metal salts of aromatic o-hydroxycarboxylic acids may be used as the catalyst, preferably in solution in dimethylformamide. The aromatic o-hydroxycarboxylic acids may carry other substituents such as alkyl groups, preferably with 1 to 6 carbon atoms, aralkyl groups, preferably with 7 to 20 carbon atoms; aryl groups, preferably with 6 to 20 carbon atoms, halogen atoms, such as chlorine, fluorine, bromine and iodine, amino groups or hydroxyl groups. Some such suitable acids from which the catalysts of this invention may be prepared include salicylic acid, 2-hydroxy-3-methyl-benzoic acid, 6-hydroxy-2,4-dimethyl benzoic acid, 5-chloro-2-hydroxy-benzoic acid, 2,4 - dihydroxy-benzoic acid, 2-hydroxy-3-methoxy-benzoic acid, 1-hydroxynaphthalene carboxylic acid-(1), 2,2′-dihydroxy-1 1′-dinaphthylmethane-dicarboxylic acid-(3,3′) and the like and mixtures thereof. Although potassium salicylate is an especially advantageous catalyst, the corresponding sodium, lithium, caesium, rubidium and the like salts may also be used to advantage in the process of this invention. Furthermore, the potassium, sodium, lithium, caesium, rubidium and the like salts of any o-hydroxycarboxylic acid may also be employed.

The catalysts of this invention may be used either alone or in combination with the usual catalysts employed in isocyanate chemistry such as, for example, organometallic compounds such as iron acetylacetonate, dialkyl tin dialcoholates, tertiary amines such as dimethyl benzylamine or 1,4-diaza(2,2,2)-bicyclooctane or basic compounds which contain at least two aromatic nuclei and at least one araliphatically bound tertiary amine grouping in the molecule and which are prepared, for example, by the condensation of polyvalent phenols, formaldehyde and secondary amines. Any other such catalysts as disclosed in U.S. Pat. 3,201,372, "Polyurethanes, Chemistry and Technology," Saunders and Frisch, Interscience Publishers and the like and mixtures thereof may also be used.

Foams of different bulk densities which have particularly high temperature resistance and which are practically non-combustible can be produced by adding blowing agents such as those disclosed in U.S. Pat. 3,201,372 including halogenated methanes or ethanes, ethylidene dichloride, vinylidene chloride or such compounds as azo compounds or sulphonyl azides which decompose to liberate gases such as nitrogen, for example. Foam stabilizers based on organosilicon compounds, the usual emulsifiers such as, for example, higher alkyl or aryl sulphonic acids and their salts, sulphuric acid esters of castor oil or ricinoleic acid and their salts, dyes and fillers such as carbon black, metal powders or cellulose may be added to the foamable reaction mixture. Flame protective agents such as trichloroethyl phosphate or halogenoalkyl phosphates in general, ammonium phosphates and mixture condensates of phenol, formaldehyde and dicyandiamide may also be added. The addition of plasticizers such as phthalic acid esters and compounds which form complexes with the structures in the foam such as, for example, dimethylformamide, tetramethyl urea, benzene, dioxane and triethyl phosphate sometimes have advantageous effects.

According to I.R. spectroscopic analyses, substantial quantities of carbodiimide structures are formed in the foam in addition to the substituted isocyanurate rings. The proportion of carbodiimide structures depends, in particular, on the polymerization temperature reached and can be increased by the catalysts commonly used in the production of carbodiimides, especially trivalent and pentavalent organophosphorus compounds such as phospholines, phospholine oxides, tert. phosphines, (cyclic) esters, amide and ester amides of phosphorous acid and phosphoric acid.

In one well known method, the foam plastics are produced by first preparing a homogeneous mixture of catalyst, stabilizers, blowing agent and/or optionally water, and compounds containing at least two hydrogen atoms reactive with NCO groups into which the polyisocyanate is mixed preferably mechanically. The resulting admixture is then poured into a suitable molding apparatus. The mixture starts to foam and solidifies to form the product with the evolution of heat. The rate of foaming and of hardening can be controlled to a large extent by the catalysts of this invention. Both rates depend on basicity and concentration of the aromatic o-hydroxycarboxylic acid salt. Higher basicity as well as higher concentration result in higher reaction rates.

The quantity of blowing agent to be used depends upon the bulk density required. Up to 100 and preferably between about 5 and about 50 parts of a fluorochloromethane or a corresponding quantity of other blowing agent, based on 100 parts of isocyanate component, will generally suffice to yield bulk densities preferably between about 15 and about 500 or more and most preferably between about 20 and about 200 kg./m.$^3$.

The quantity of the compound containing hydrogen atoms reactive with NCO groups, if used, will generally be adjusted so that a sufficient quantity of free isocyanate groups will still be available to take part in the polymerization reaction. The quantity of reactive hydrogen-containing compounds is advantageously calculated so that at least about 50% and preferably more than about 70% of the total number of isocyanate groups put into the reaction will be available for polymerization. It is to be understood, however, that compounds containing reactive hydrogen atoms may be omitted altogether.

A catalytic quantity of the alkali metal salt of the aromatic o-hydroxycarboxylic acid is used as the polymerization catalyst; this quantity may be varied within wide limits depending upon the polyisocyanate and other reactants used. Preferably, from about 0.5% to about 5% by weight, based on the weight of the isocyanate component, is used. The usual auxiliary agents such as pigments and flame protective agents such as antimony compounds, phosphorus compounds or halogen compounds may be added in addition to the components used for the production of the synthetic resin.

Homogeneous synthetic resins such as lacquers may also be produced by methods which are known in principle. Solvents are used in the lacquers which may be applied to and hardened on all sorts of different substrates such as wood, glass, metal, or paper, if desired, after first adding the usual lacquer additives and pigments for example. The condensation may also be completed at elevated temperature.

Homogeneous resins are produced, for example, by pouring the polyisocyanates or polyisocyanate mixtures to which the catalysts of this invention has been added into molds, if required with cooling or after-heating. Infrared spectroscopic investigation of the products of the process shows high proportions of isocyanurate rings in addition to certain amounts of carbodiimide groups.

The products of the process of this invention are used for many different purposes such as, for example heat resistant, non-combustible or combustion resistant coatings, elastomeric products and foam plastics which may be used, for example, for insulating purposes, corrosion protection and as heat insulating means.

The invention is further illustrated but is not intended to be limited by the following examples in which all parts and percentages are by weight unless otherwise specified.

EXAMPLES (A) Comparison of the polymerizing action of sodium or potassium salicylate with that of known catalysts $A_1$: About 1 part of sodium salicylate dissolved in about 4 parts of dimethylformamide polymerizes about 50 parts of crude diphenyl methane diisocyanate containing approximately 30% NCO [1] in about 4 minutes to form a hard, non-combustible resin. The temperature reached during polymerization reaction is about 160° C.

$A_2$: About 1 part of potassium salicylate dissolved in about 4 parts of dimethylformamide polymerizes about 50 parts of crude diphenyl methane diisocyanate [1] in about 2.5 minutes to form a hard, non-combustible resin. A temperature of about 70° C. is reached during the polymerization reaction.

$A_3$: About 1 part of sodium benzoate suspended in about 4 parts of dimethylformamide (in which it will not dissolve) does not give rise to any reaction with about 50 parts of crude diphenyl methane diisocyanate [1] even after about 15 minutes.

$A_4$: About 1 part of sodium methylate suspended in about 4 parts of dimethylformamide resembles sodium benzoate in its lack of activity with respect to crude diphenyl methane diisocyanate.[1]

$A_5$: A solution of about 1 part of sodium phenolate in about 4 parts of dimethylformamide forms hard lumps when mixed with about 50 parts of crude diphenyl methane diisocyanate.[1] Most of the isocyanate is still liquid after 15 minutes.

(B) Example 1 and comparative example

About 100 parts of above crude diphenyl methane-4,4'-diisocyanate which can be obtained by aniline-formaldehyde condensation followed by phosgenation of the crude polyamine mixture are added with intensive mixing to a mixture of about 12 parts of monofluorotrichloromethane, about 2 parts of a polysiloxane-polyether copolymer [2] and a solution of about 2 parts of the catalyst indicated in the following table then about 4 parts of N,N-dimethylformamide. The mixture is then poured into prepared paper molds.

The reaction times and properties of the polyisocyanurate foams thus obtained are indicated in the following table.

It is to be understood that any of the components and conditions mentioned as suitable herein can be substituted for its counterpart in the foregoing examples and that although the invention has been described in considerable detail in the foregoing, such detail is solely for the purpose of illustration.

|  | Catalyst | Reaction time secs. | | | | Bulk density, kg./m.$^3$ | Compression strength, kg. wt./cm.$^2$ | Heat bending resistance, degree C. | Contour change at— | | ASTM D-1692 | Torch test [1] |
| --- | --- | --- | --- | --- | --- | --- | --- | --- | --- | --- | --- | --- |
|  |  | $t_R$ | $t_A$ | $t_S$ | $t_K$ |  |  |  | −30° | +100° |  |  |
| Example | Potassium salicylate | [2] 55 | [2] 60 | [2] 90 | [2] 75 | 39 | 2.9 | 250 | None | None | N.c.[2] | 17.2 |
| Comparative example | Sodium benzoate | 60 | | | | | | | | | | |
| Do | Potassium benzoate | 60 | | | | No foam can be produced | | | | | | |

[1] Time for burning through in minutes.
[2] "Non-combustible" according to this standard.
NOTE.—$t_R$=stirring time; $t_A$=setting time (internal); $t_S$=rising time; $t_K$=setting time (external).

[1] Such as may be obtained by aniline-formaldehyde condensation followed by phosgenation of the resulting polyamine mixture and consisting of a mixture of 55% of Binuclear, 20% of trinuclear and 25% of higher nuclear polymethylene polyphenyl polyisocyanates.
[2] Silicone stabilizer L 5320 of Union Carbide Corp.

What is claimed is:

1. A process for the preparation of synthetic resins based on isocyanates which comprises polymerizing an organic compound having more than one isocyanate group in the molecule with a catalytic amount of an alkali metal salt of an aromatic o-hydroxycarboxylic acid.

2. The process of claim 1 wherein the reaction mixture contains up to about 50 percent on an equivalent basis based on the total number of isocyanate groups present of an organic compound containing hydrogen atoms which are reactive with NCO groups.

3. The process of claim 1 wherein the alkali metal salt is present in solution in dimethylformamide.

4. The process of claim 1 wherein the alkali metal salt is potassium salicylate.

5. The process of claim 1 wherein the alkali metal salt is present at a concentration of from about 0.5 percent to about 5 percent by weight based on the weight of the isocyanate.

6. The process of claim 1 wherein the reaction mixture contains a blowing agent.

7. The process of claim 1 wherein the alkali metal salt is sodium salicylate.

References Cited

UNITED STATES PATENTS

| 2,978,449 | 4/1961 | France et al. | 260—248 |
| 3,516,950 | 6/1970 | Haggis et al. | 260—2.5 |

FOREIGN PATENTS

| 1,155,768 | 6/1969 | Great Britain | 260—2.5 |

DONALD E. CZAJA, Primary Examiner

C. W. IVY, Assistant Examiner

U.S. Cl. X.R.

260—2.5 AB, 32.6 N, 77.5 NC, 77.5 AB, 248 NS